(12) United States Patent
Pahk et al.

(10) Patent No.: US 7,243,571 B2
(45) Date of Patent: Jul. 17, 2007

(54) ULTRA-PRECISION POSITIONING SYSTEM

(76) Inventors: Heui-Jae Pahk, Na-404, Kyosu Apt., 224-2, Bongchun-dong, Kwanak-ku, Seoul (KR) 151-050; Jong-Ho Park, Ra-303, Kookminhouse, Songjeong-dong, Icheon-si, Kyungki-do, Icheon-si (KR) 467-040

( * ) Notice: Subject to any disclaimer, the term of this patent is extended or adjusted under 35 U.S.C. 154(b) by 669 days.

(21) Appl. No.: 10/474,825

(22) PCT Filed: Aug. 6, 2001

(86) PCT No.: PCT/KR01/01338

§ 371 (c)(1),
(2), (4) Date: Mar. 8, 2004

(87) PCT Pub. No.: WO02/083359

PCT Pub. Date: Oct. 24, 2002

(65) Prior Publication Data

US 2004/0138766 A1    Jul. 15, 2004

(30) Foreign Application Priority Data

Apr. 16, 2001   (KR) .............................. 2001-20264

(51) Int. Cl.
*G05G 11/00*    (2006.01)
(52) U.S. Cl. .............................. 74/490.08; 74/490.09; 73/105

(58) Field of Classification Search ............. 74/490.08, 74/490.09, 470, 471 R; 73/105, 866.5
See application file for complete search history.

(56) References Cited

U.S. PATENT DOCUMENTS

| | | | |
|---|---|---|---|
| 6,346,710 B1* | 2/2002 | Ue | 250/442.11 |
| 6,501,210 B1* | 12/2002 | Ueno | 310/331 |
| 6,744,228 B1* | 6/2004 | Cahill et al. | 318/135 |
| 6,817,104 B2* | 11/2004 | Kaneko et al. | 33/1 M |
| 7,117,724 B1* | 10/2006 | Goodberlet et al. | 73/105 |
| 2003/0051331 A1* | 3/2003 | Amatucci et al. | 29/466 |
| 2003/0213135 A1* | 11/2003 | Kaneko et al. | 33/1 M |
| 2005/0002009 A1* | 1/2005 | Lee | 355/72 |
| 2005/0231075 A1* | 10/2005 | Xu | 310/328 |
| 2006/0098184 A1* | 5/2006 | Shibazaki | 355/75 |

* cited by examiner

*Primary Examiner*—David M. Fenstermacher
(74) *Attorney, Agent, or Firm*—Lowe Hauptman & Berner (57) ABSTRACT

Provided is an ultra-precision positioning system. The system comprises a base, a motion stage movably provided to the top of the base, and first to sixth feeding mechanisms for moving the motion stage to have six degrees of freedom. The first to sixth feed mechanisms are fixed to the base and the motion stage, respectively. Each of the first to third feeding mechanisms has a piezo actuator and two elastic hinges provided at both sides of the piezo actuator. Each of the fourth to sixth feeding mechanisms has a piezo actuator, three hinge members, and a lever member with a notch hinge which operatively cooperates with the hinge members.

9 Claims, 12 Drawing Sheets

ULTRA-PRECISION POSITIONING SYSTEM

TECHNICAL FIELD

The present invention relates to an ultra-precision positioning system, and more particularly, to an ultra-precision positioning system capable of precisely performing a multi-degree-of-freedom fine motion of the submicron order.

BACKGROUND ART

As well known, the importance of ultra-precision positioning technology has gradually increased in a variety of industrial fields. In particular, the development of semiconductor technology results in high integration of circuits. Consequently, a line width for use in the latest microprocessor is in the order of 0.18 μm which is 1/500 times as large as the diameter of a hair. In such a case, the accuracy required for a wafer manufacturing stage should meet reproducibility requirements of 20 nm that is 1/10 times as large as the line width. Further, an ultra-precision feeding apparatus implemented in the submicron order can be utilized in ultra-precision measurement fields, such as an atomic force microscope (AFM) and a scanning electron microscope (SEM), and in industrial fields including the information industry, and thus, it has a wide range of application.

A general positioning apparatus using a linear motor, or a servomotor and a ball screw has a relatively long stroke. However, it has a limitation on implementable positional accuracy due to a structural limitation such as backlash. The general positioning apparatus also has a disadvantage in that the height of the entire system is increased since an actuator is arranged vertically to obtain a vertical motion. This leads to many difficulties in controlling a vertical position in works requiring high accuracy.

Meanwhile, the ultra-precision positioning apparatus for achieving a motion of submicron order should be designed in such a manner that there is no frictional portion to eliminate or minimize nonlinear factors. Further, in the ultra-precision positioning apparatus, the actuator itself should be constructed by a component that can be easily driven in the submicron order and has high repeatability. Moreover, it is necessary to design the ultra-precision positioning apparatus so that its height can be kept as low as possible.

DISCLOSURE OF INVENTION

The present invention is conceived to solve the aforementioned problems in the prior art. An object of the present invention is to provide an ultra-precision positioning system capable of precisely performing a multi-degree-of-freedom fine motion of the submicron order.

Another object of the present invention is to provide an ultra-precision positioning system, wherein there is no interference wear and very high repeatability can be maintained, thanks to hinge structures having elasticity.

A further object of the present invention is to provide an ultra-precision positioning system capable of performing a continuous and smooth fine motion.

A still further object of the present invention is to provide an ultra-precision positioning system capable of making the entire height thereof low and enhancing the stiffness of a motion stage itself.

A still further object of the present invention is to provide an ultra-precision positioning system which is little influenced by a change or gradient of temperature.

In order to achieve the above objects, an ultra-precision positioning system according to the present invention comprises a base; a motion stage movably provided above a top of the base; a first feeding means including a first actuator and first and second hinge elements with a circular hinge, the first feeding means performing an x-axis translational motion of the motion stage with respect to the base; a second feeding means including a second actuator and first and second hinge elements with a circular hinge, the second feeding means performing a y-axis translational motion and a z-axis rotational motion of the motion stage with respect to the base; a third feeding means including a third actuator and first and second hinge elements with a circular hinge, the third feeding means performing the y-axis translational motion and the z-axis rotational motion of the motion stage with respect to the base in cooperation with the second feeding means; a fourth feeding means including a fourth actuator, first and second hinge members with a circular hinge, a first lever member cooperating with the second hinge member, and a third hinge member cooperating with the first hinge member, the fourth feeding means performing an x-axis rotational motion of the motion stage with respect to the base; and a control means for controlling the first to fourth actuators of the first to fourth feeding means.

BEST MODE FOR CARRYING OUT THE INVENTION

Hereinafter, a preferred embodiment of an ultra-precision positioning system according to the present invention will be described in detail with reference to the accompanying drawings.

Figure 1:
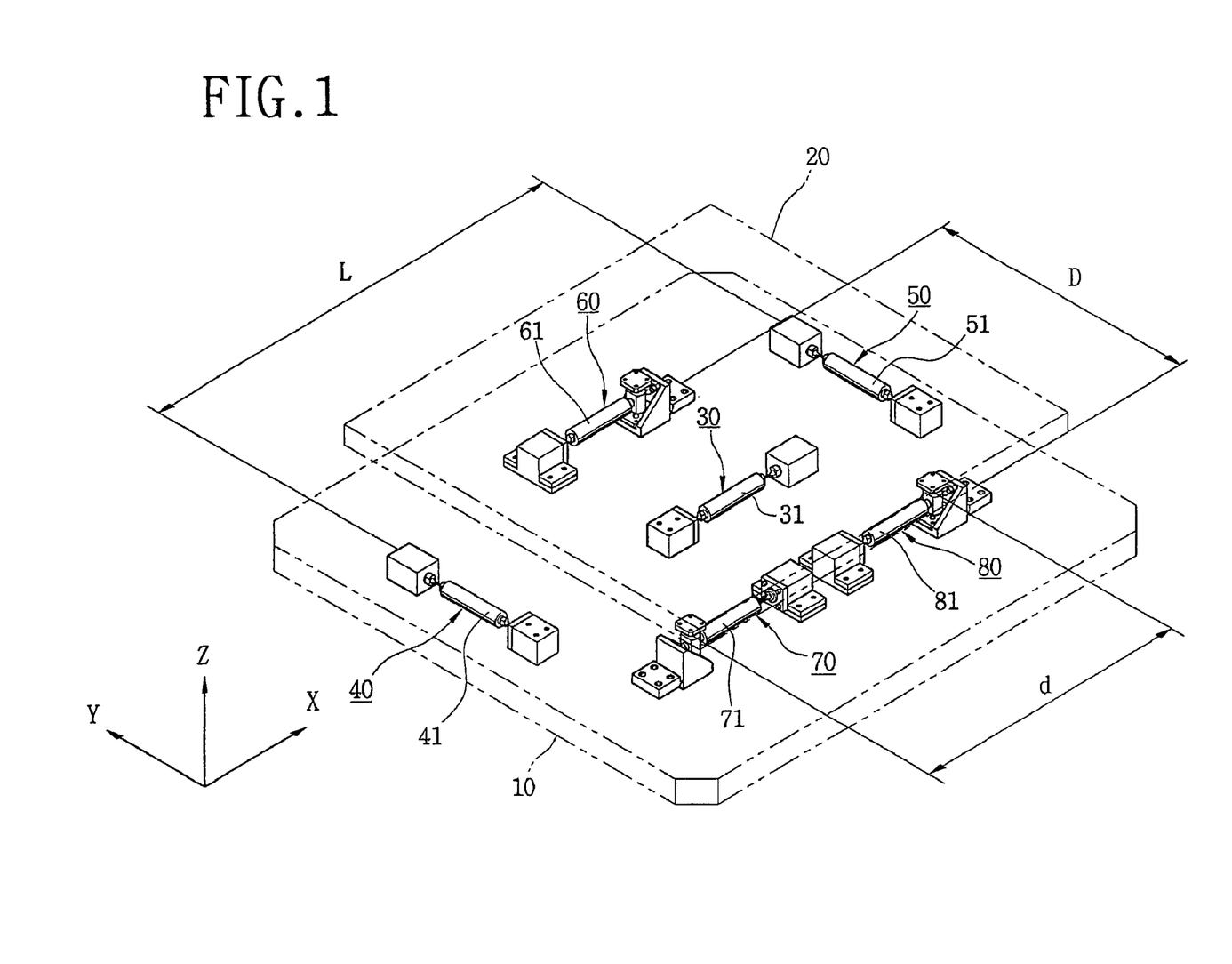
FIG. 1 is a perspective view schematically showing the entire constitution of an ultra-precision positioning system according to the present invention.
Figure 3:
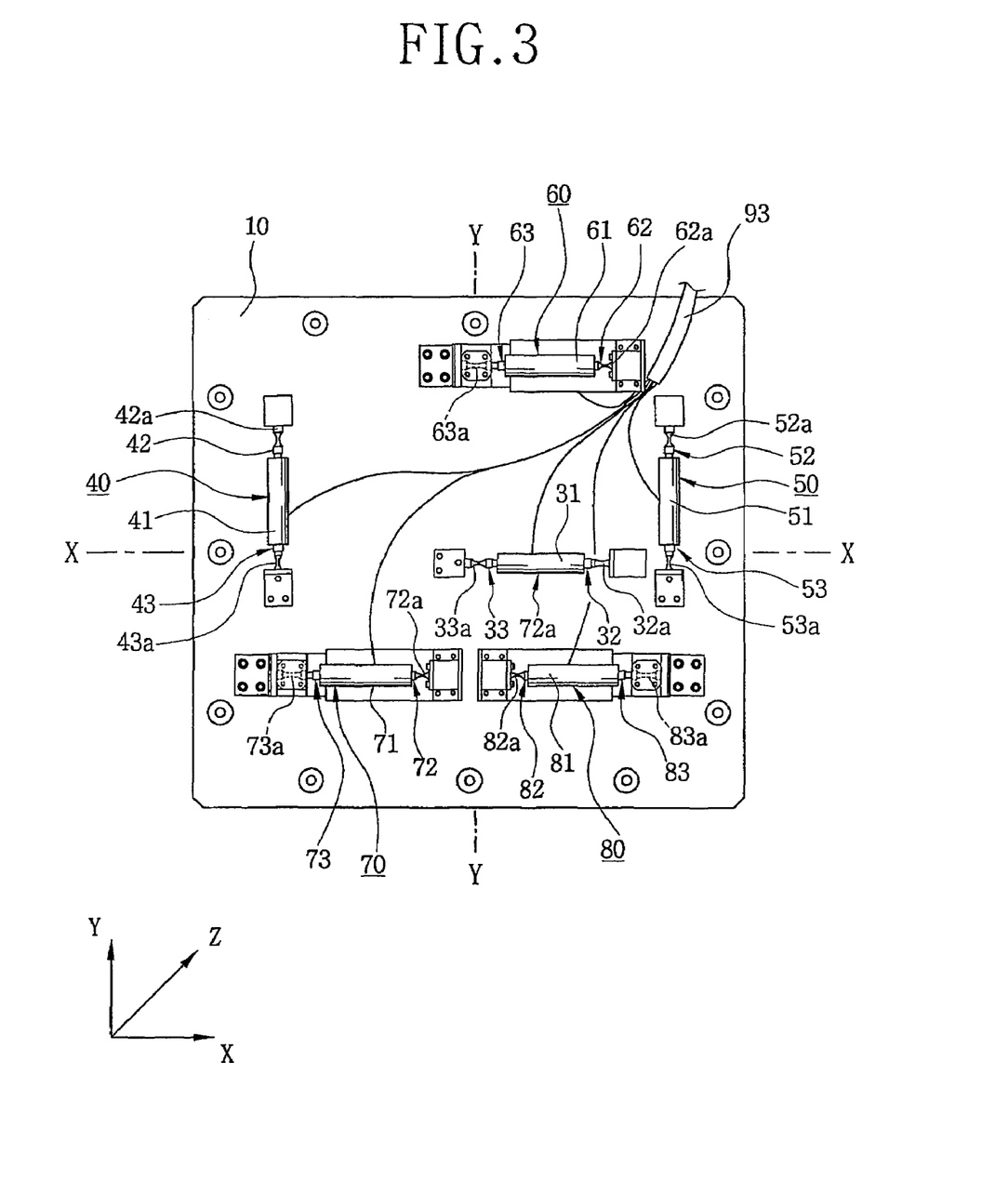
FIG. 3 is a plan view showing the constitutions of a base and first to sixth feeding mechanisms of the ultra-precision positioning system according to the present invention in a state where a motion stage is removed therefrom.

Referring first to FIGS. 1 and 3, an ultra-precision positioning system according to the present invention comprises a stationary base 10, a motion stage 20 which is provided above a top of the base 10 and makes a six-degree-of-freedom motion with respect to the base 10, first to sixth feeding mechanism 30, 40, 50, 60, 70 and 80 for performing the six-degree-of-freedom motion of the motion stage 20 with respect to the base 10. The first feeding mechanism 30 performs an x-axis translational motion of the motion stage 20 with respect to the base 10, as shown in FIG. 1. The second and third feeding mechanisms 40, 50 cooperate with each other and perform a y-axis translational motion and a z-axis rotational motion of the motion stage 20 with respect to the base 10. The fourth to sixth feeding mechanisms 60, 70 and 80 cooperate with one another and perform a z-axis translational motion, an x-axis rotational motion and a y-axis rotational motion of the motion stage 20 with respect to the base 10.

Referring to FIG. 3, the first to third feeding mechanisms 30, 40 and 50 comprise first to third piezo actuators 31, 41 and 51, and first hinge elements 32, 42 and 52 with circular hinges 32a, 42a and 52a and second hinge elements 33, 43 and 53 with circular hinges 33a, 43a and 53a to constitute stage driving parts. The first hinge elements 32, 42, and 52 and the second hinge elements 33, 43, and 53 are fixedly arranged to both ends of each of the first to third piezo actuators 31, 41 and 51. The fourth to sixth feeding mechanisms 60, 70 and 80 comprise fourth to sixth piezo actuators 61, 71 and 81, and first, fourth and seventh hinge members 62, 72 and 82 with circular hinges 62a, 72a and 82a, and second, fifth and eighth hinge members 63, 73 and 83 with circular hinges 63a, 73a and 83a to constitute stage driving parts. The first, fourth and seventh hinge members 62, 72 and 82 and the second, fifth and eighth hinge members 63, 73 and 83 are fixedly arranged to both ends of each of the fourth to sixth piezo actuators 61, 71 and 81 and constitute stage driving parts, respectively. The fourth to sixth feeding mechanisms 60, 70 and 80 further comprise third, sixth and eighth hinge members 67, 77 and 87; and first, second and third lever members 68, 78 and 88, respectively. The circular hinges are elastic hinges which have a linear relationship between force and displacement and make a deformable motion using elastic deformation of the material itself of the hinges. Further, since the circular hinges have no relative motions at contact surfaces, their driving by fine displacement is made continuous and a smooth motion locus is provided. Moreover, since fracture mechanism due to fatigue or excessive force can be easily expected in brittle material, a hinge structure made of elastic-brittle material can be easily applied to a system having very high repeatability. Although the present embodiment utilizes the piezo actuator, it may employ a voice coil actuator or a magnetic actuator instead of the piezo actuator.

The first feeding mechanism 30 is aligned with an x-axis centerline of the base 10, and a center of the hinge 33a of the second hinge element 33 of the first feeding mechanism 30 which is positioned on a side to be fixed to the motion stage 20 is coincident with the center of the motion stage 20. FIG. 3 clearly shows that the center of the hinge 33a of the first feeding mechanism 30 is coincident with an intersecting point of the x-axis centerline and a y-axis centerline which is the center of the base 10 or the motion stage 20. The second and third feeding mechanisms 40, 50 are arranged parallel to a y-axis centerline of the base 10, and the hinges 43a, 53a of the second hinge elements 43, 53 of the second and third feeding mechanisms 40, 50 lie on the x-axis centerline, as shown in FIG. 3. The fourth feeding mechanism 60 is arranged above and parallel to the x-axis centerline of the base 10, and the hinge 63a of the fourth feeding mechanism 60 which is positioned on a side to be fixed to the motion stage 20 lies on the y-axis centerline of the base 10. The fifth and sixth feeding mechanisms 70, 80 are arranged below and parallel to the x-axis centerline of the base 10 and to be symmetric with each other with respect to the y-axis centerline. The fourth feeding mechanism 60 and the fifth and sixth feeding mechanisms 70, 80 are installed to be spaced apart by a predetermined interval D (see FIG. 1) from each other, as will be described later.

Figure 2:
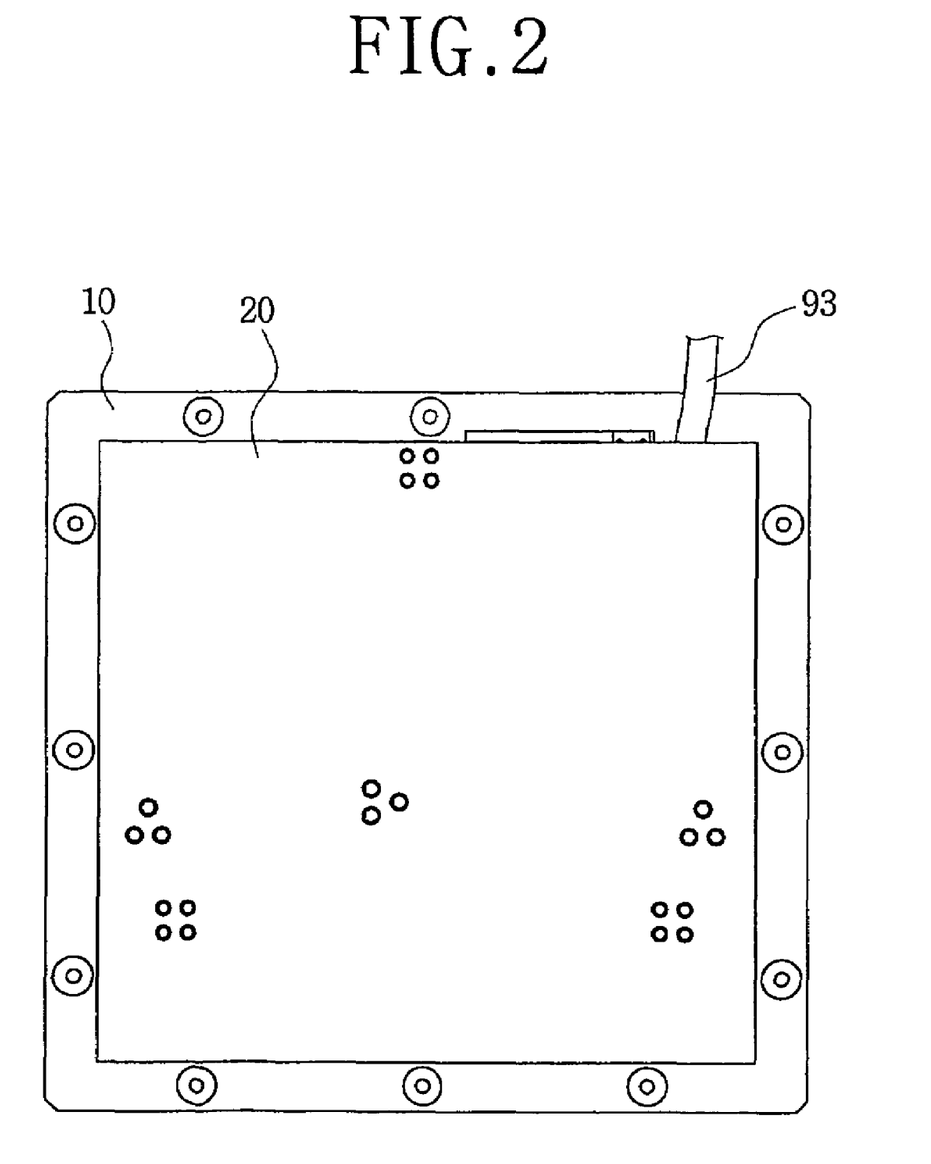
FIG. 2 is a plan view of the ultra-precision positioning system according to the present invention.
Figure 4:
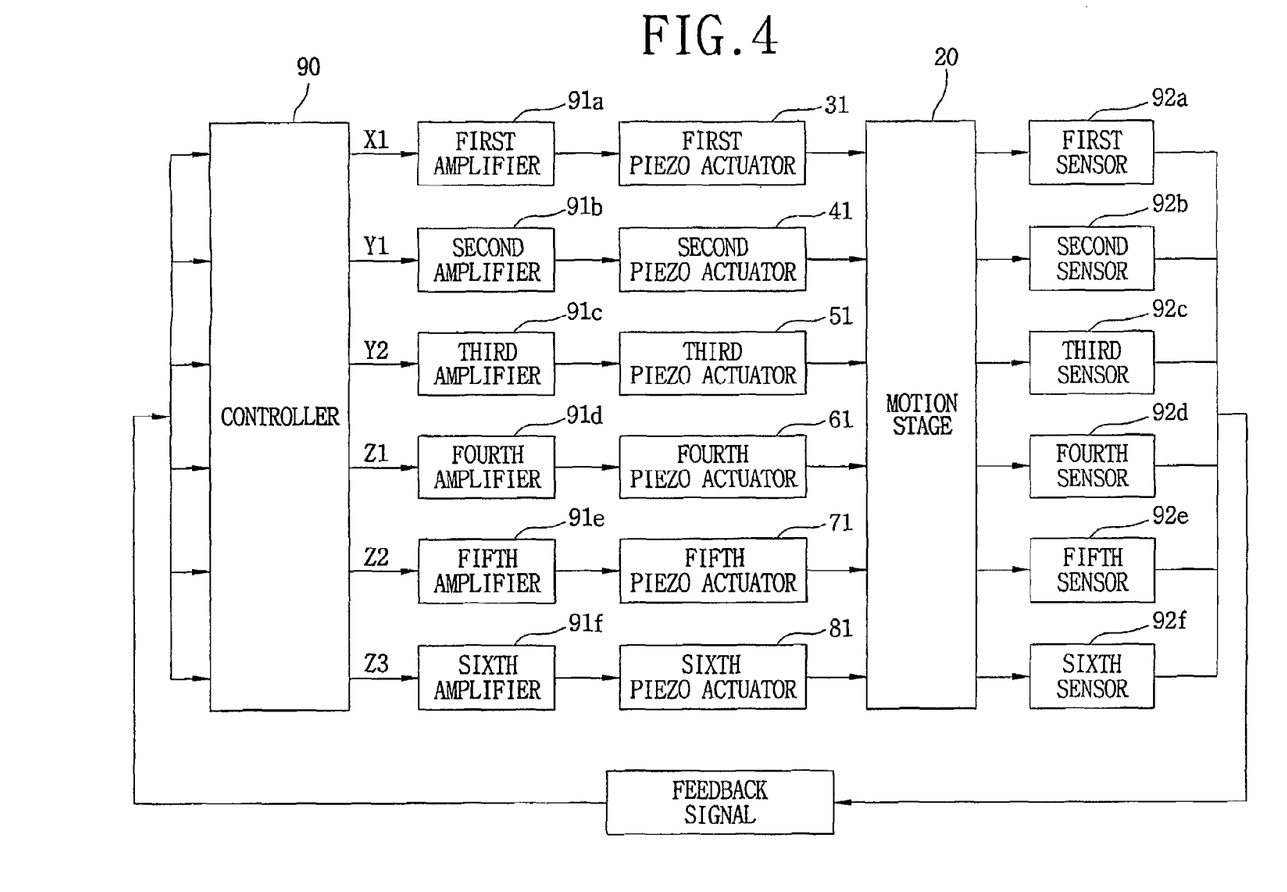
FIG. 4 is a block diagram illustrating a control means of the ultra-precision positioning system according to the present invention.

FIG. 4 shows a block diagram of control of the ultra-precision positioning system according to the present invention. Referring to FIG. 4, in order to perform an ultra-precision motion of the motion stage 20, the ultra-precision positioning system according to the present invention comprises a controller 90 for outputting and controlling driving signals for use in drive of the first to sixth piezo actuators 31, 41, 51, 61, 71 and 81; first to sixth amplifiers 91a to 91f for amplifying the driving signals from the controller 90 and inputting the amplified signals into the first to sixth piezo actuators 31, 41, 51, 61, 71 and 81, and first to sixth sensors 92a to 92f for detecting a motion position of the motion stage 20 moved by the first to sixth feeding mechanisms 30, 40, 50, 60, 70 and 80. In the present embodiment, each of the first to sixth sensors 92a to 92f can include a mirror (not shown) attached to the top of the motion stage 20, and a laser interferometer (not shown) having a laser for scanning the mirror with a laser beam. Further, as shown in FIGS. 2 and 3, the first to sixth piezo actuators 31, 41, 51, 61, 71 and 81 and the controller 90 are electrically connected with one another through a cable 93.

The driving signals for the first to sixth piezo actuators 31, 41, 51, 61, 71 and 81 are outputted by means of the control of the controller 90. When the signals amplified by the first to sixth amplifier 91a to 91f are inputted into the first to sixth piezo actuators 31, 41, 51, 61, 71 and 81, displacement is generated in each of the first to sixth piezo actuators 31, 41, 51, 61, 71 and 81. Each displacement generated from the first to sixth piezo actuators 31, 41, 51, 61, 71 and 81 is transferred to the motion stage 20 through the aforementioned circular hinges 33a, 43a, 53a, 63a, 73a and 83a so that the motion stage 20 is moved. The motion position of the motion stage 20 is detected by the first to sixth sensors 92a to 92f and the controller 90 corrects the motion position of the motion stage 20 based on feedback signals inputted from the first to sixth sensors 92a to 92f.

Figure 5:
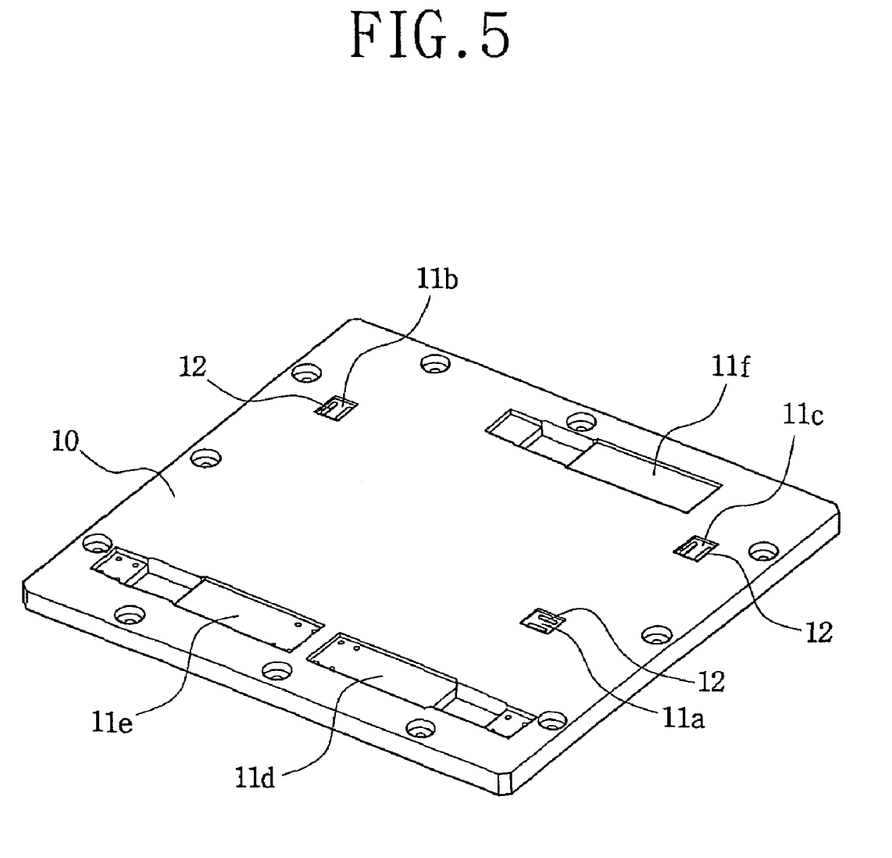
FIG. 5 is a perspective view showing the constitution of the base of the ultra-precision positioning system according to the present invention.

As shown in FIG. 5, first to sixth installation recesses 11a to 11f for allowing the first to sixth feeding mechanisms 30, 40, 50, 60, 70 and 80 to be installed therein are formed in the top of the base 10, and slots 12 are formed in the first to third installation recesses 11a to 11c, respectively.

Figure 6A:
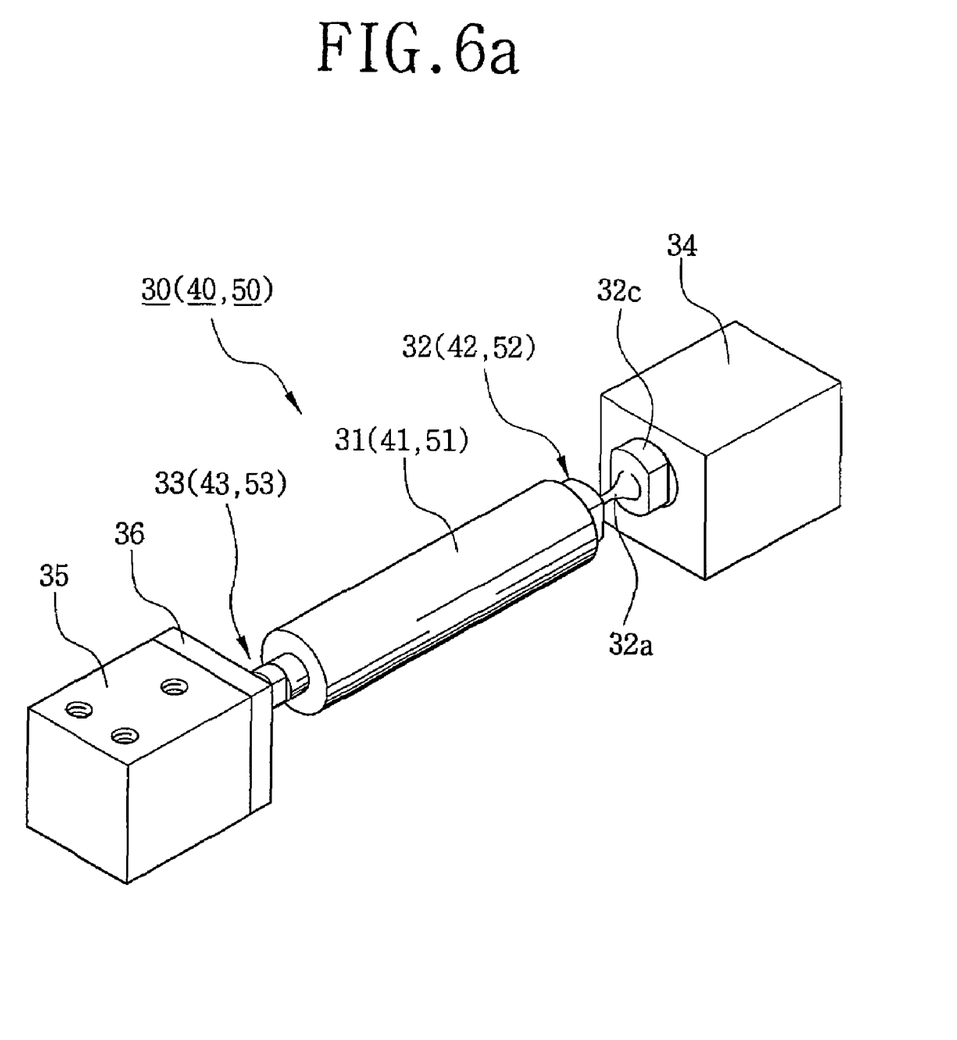
FIGS. 6a and 6b are a perspective view and an exploded perspective view showing the constitution of the first feeding mechanism according to the present invention.
Figure 6B:
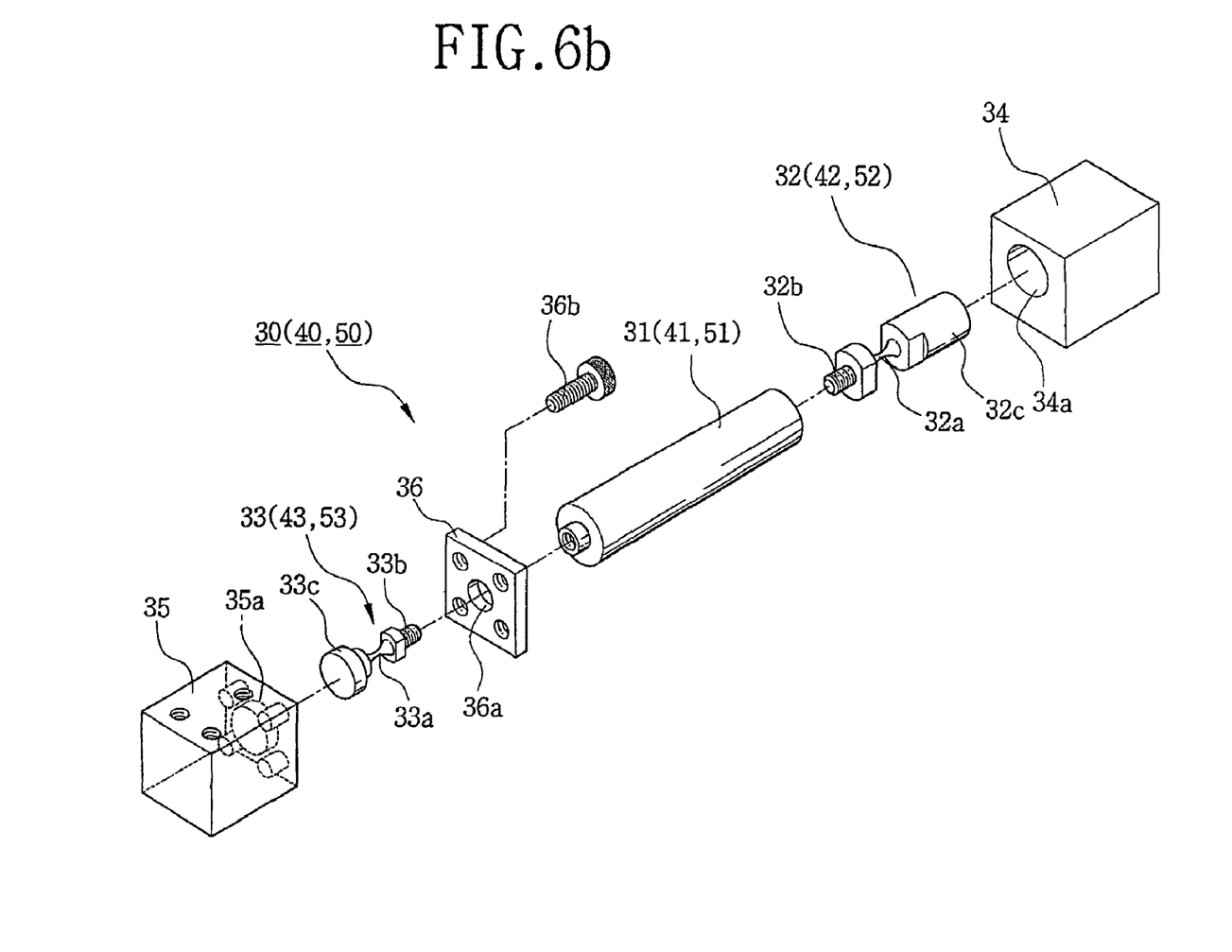

Referring to FIGS. 3, 6a and 6b, threaded parts 32b, 33b formed at each one end of the first and second hinge elements 32, 33 are fastened to both the ends of the piezo actuator 31 of the first feeding mechanism 30, respectively. A cylindrical fixing portion 32c formed at the other end of the first hinge element 32 is fixedly fitted into a hole 34a of a first fixing block 34. The first fixing block 34 is fitted into the first installation recess 11a of the base 10 and then fixedly attached thereto by fixing means which penetrate through the slots, for example, screws. A cylindrical fixing portion 33c formed at the other end of the second hinge element 33 is fixedly fitted into a hole 35a of a second fixing block 35, and the second fixing block 35 is fixedly attached to the bottom of the motion stage 20 by means of fastening of screws. A support plate 36 has a hole 36a formed in a center thereof to support a fixing portion 33c of the second hinge element 33 fitted into a hole 35a of the second fixing block 35. The support plate 36 is fixedly attached to the second fixing block 35 by means of fastening of screws 36b to prevent escape of the second hinge element 33.

In the ultra-precision positioning system according to the present invention, the second and third feeding mechanisms 40, 50 are constructed in the same way as the first feeding mechanism 30. Therefore, since the constitutions and operations of the second piezo actuator 41 and first and second hinge elements 42, 43 of the second feeding mechanism 40 and the third piezo actuator 51 and first and second hinge elements 52, 53 of the third feeding mechanism 50 are the same as the first piezo actuator 31 and first and second hinge elements 32, 33 of the first feeding mechanism 30, the detailed description of the second and third feeding mechanisms 40, 50 will be omitted.

Figure 7A:
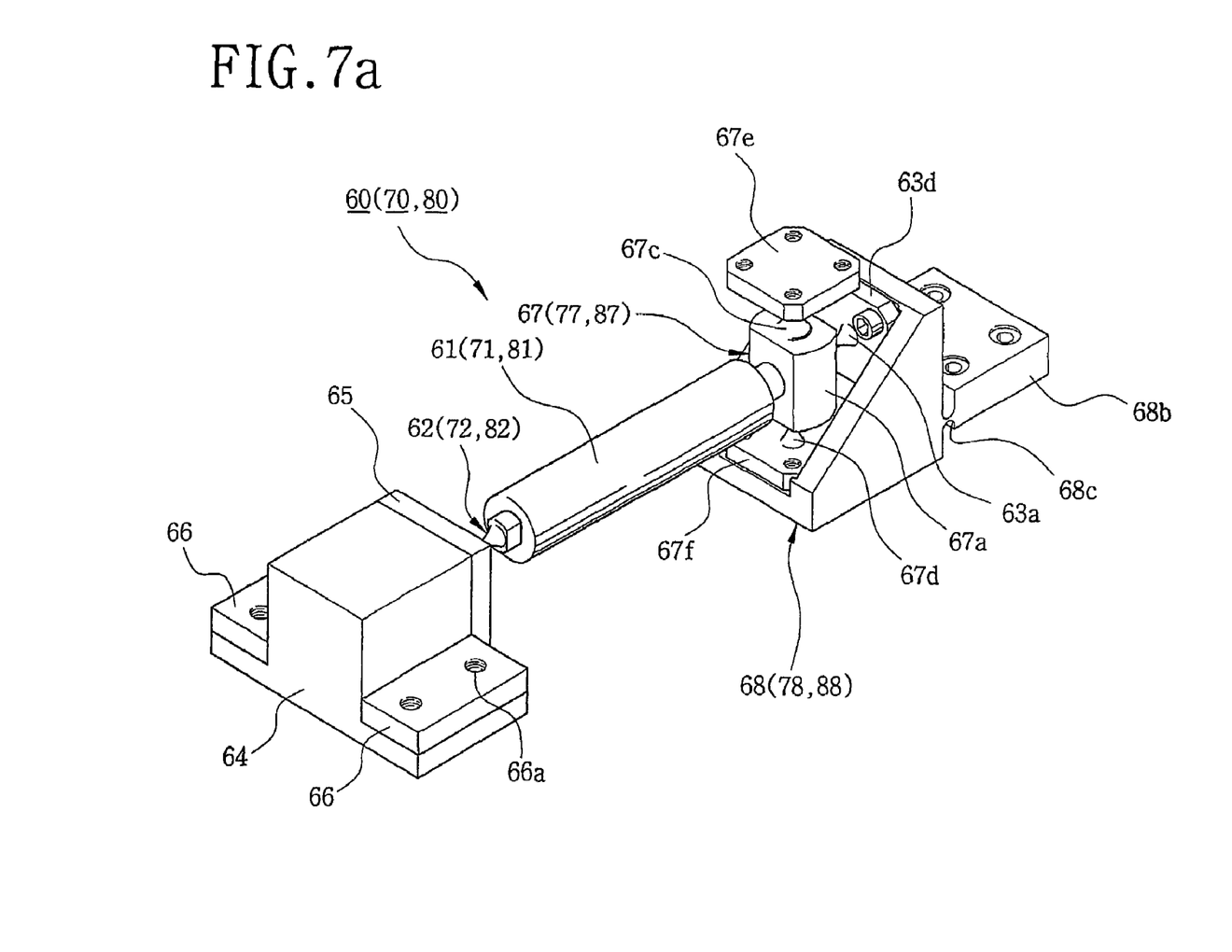
FIGS. 7a and 7b are a perspective view and an exploded perspective view showing the constitution of the fourth feeding mechanism according to the present invention.
Figure 7B:
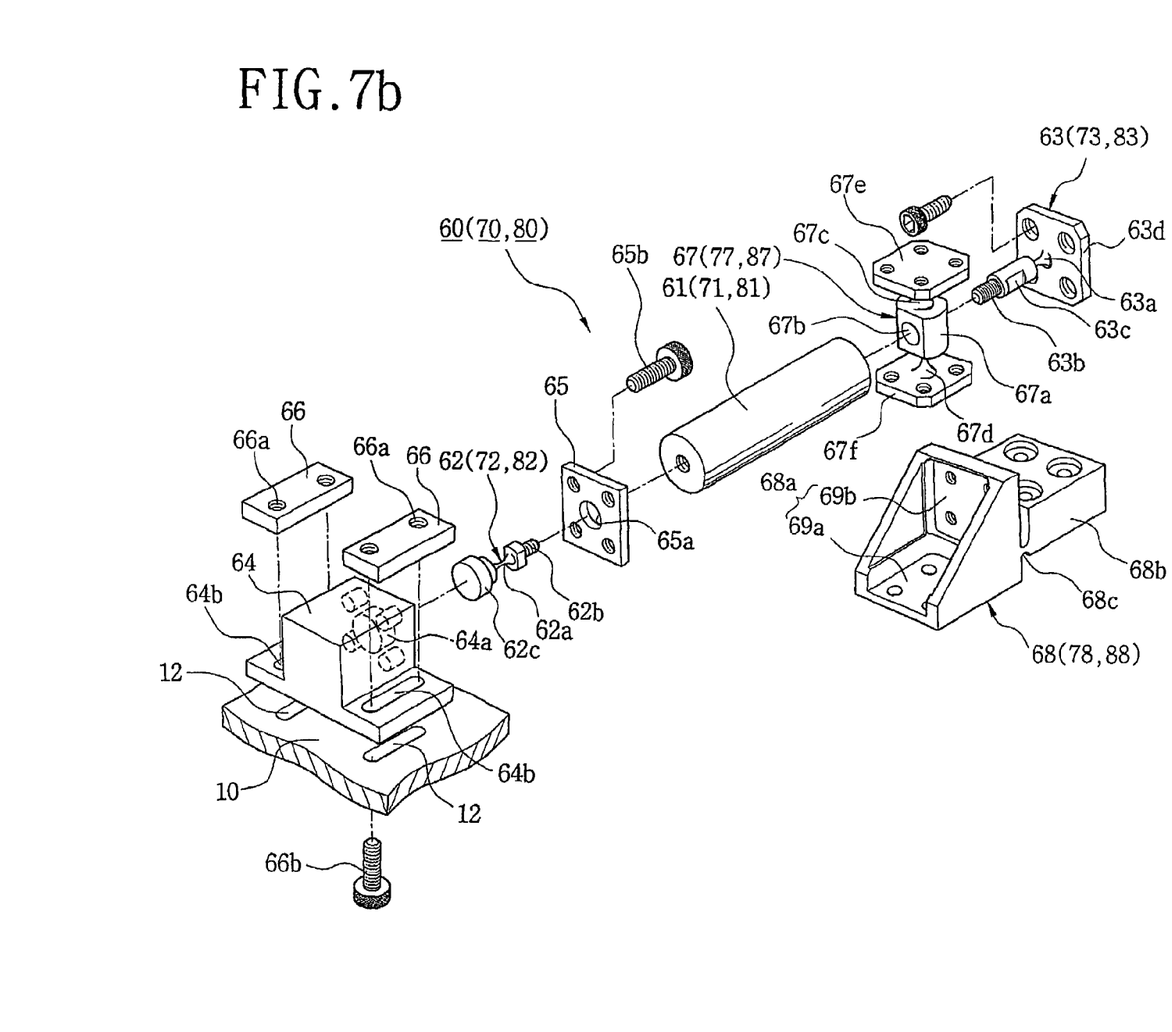

Referring to FIGS. 3, 7a and 7b, threaded parts 62b, 63b formed at each one end of the first and second hinge members 62, 63 are fastened to both the ends of the fourth piezo actuator 61 of the fourth feeding mechanism 60, respectively. A cylindrical fixing portion 62c formed at the other end of the first hinge member 62 is fitted into a hole 64a of a fixing block 64. A support plate 65 has a hole 65a formed in a center thereof to support a fixing portion 62a of the first hinge member 62 fitted into the hole 64a of the fixing block 64. The support plate 65 is fixedly attached to the fixing block 64 by means of fastening of screws 65b to prevent escape of the first hinge member 62. Slots 64b are formed at both sides of the fixing block 64, and pads 66 are positioned at the tops of the slots 64b of the fixing block 60, respectively. The fixing block 64 is fitted into one side portion of the first installation recess 11d of the base 10, and screws 66b penetrate through the base 10 and the slots 64b of the fixing block 64 and are engaged with threaded holes 66a of the pads 66. Thus, the fixing block 64 is fixedly attached to the base 10.

Further, a cylindrical extension 63c is formed between the hinge 63a and the threaded portion 63b of the second hinge member 63 and a joint plate 63d is formed at the other end of the second hinge member 63. The extension 63c of the second hinge member 63 is fitted into a hole 67b of a body 67a of the third hinge member 67 disposed perpendicularly to the fourth piezo actuator 61. Upper and lower ends of the body 67a of the third hinge member 67 are formed with first and second circular hinges 67c, 67d, respectively. First and second joint plates 67e, 67f are connected to the first and second circular hinges 67c, 67d of the third hinge member 67, respectively. The first joint plate 67e of the third hinge member 67 is fixedly attached to the bottom of the motion stage 20 by means of fastening of screws.

The fourth feeding mechanism 60 includes a first lever member 68 which cooperates with the second hinge member 63 and the third hinge member 67. The first lever member 68 comprises a first lever 68a, a second lever 68b, and a notch hinge 68c for integrally connecting the first lever 68a and the second lever 68b. The first lever 68a comprises a horizontal portion 69a and a vertical portion 69b, and the second lever 68b is disposed to be perpendicular to the vertical portion 69b of the first lever 68a. The second joint plate 67f of the third hinge member 67 is fixedly attached to the horizontal portion 69a of the first lever 68a by means of fastening of screws, while a joint plate 64d of the second hinge member 63 is fixedly attached to the vertical portion 69b of the first lever 68a by means of fastening of screws. The second lever 68b of the first lever member 68 is fixedly attached to the installation recess 11d of the base 10 by means of fastening of screws.

In the ultra-precision positioning system according to the present invention, the fifth and sixth feeding mechanisms 70, 80 are constructed in the same way as the fourth feeding mechanism 60. Therefore, since the constitutions and operations of the fifth piezo actuator 71, fourth to sixth hinge members 72, 73 and 77 and second lever member 78 of the fifth feeding mechanism 70 and the sixth piezo actuator 81, seventh to ninth hinge members 82, 83 and 87 and third lever member 88 of the sixth feeding mechanism 80 are the same as the fourth piezo actuator 61, first to third hinge members 62, 63 and 67 and the first lever member 68 of the fourth feeding mechanism 60, the detailed description of the fifth and sixth feeding mechanisms 70, 80 will be omitted.

Figure 8:
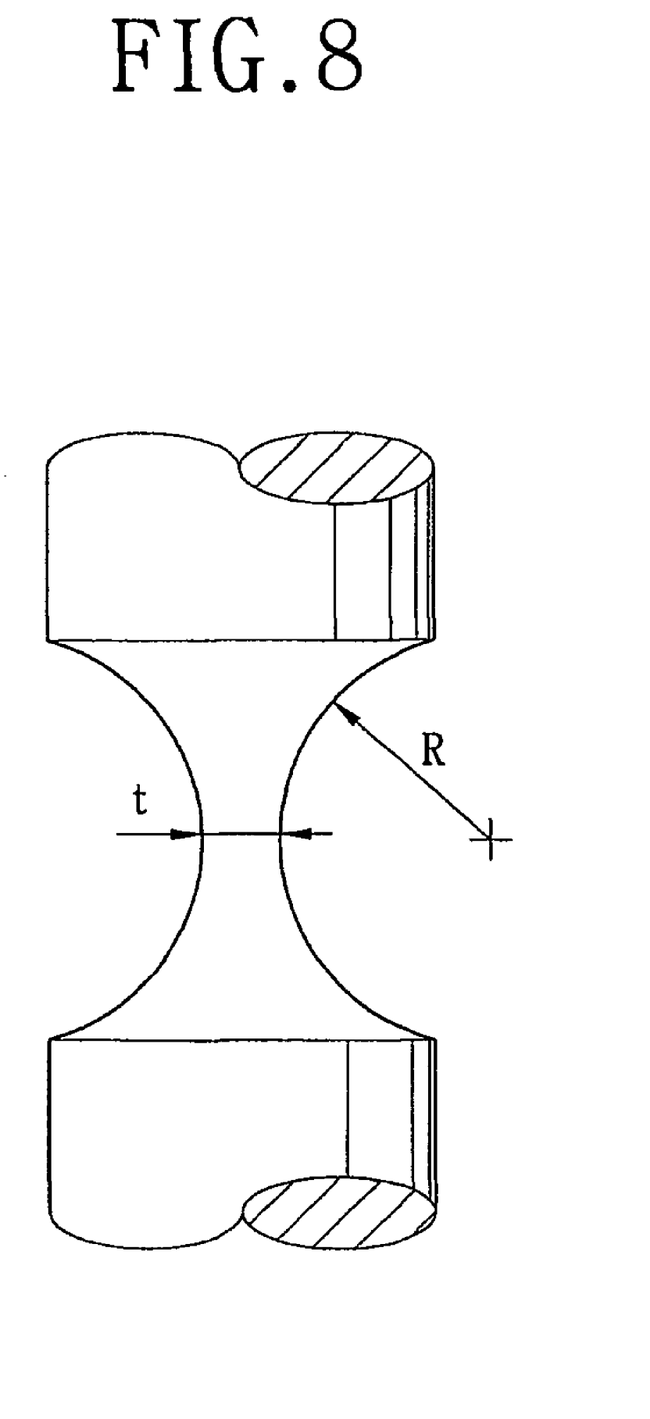
FIG. 8 is a partial front view illustrating the constitution of a circular hinge in the ultra-precision positioning system according to the present invention.

In the ultra-precision positioning system according to the present invention constructed as such, since the circular hinges are elastically deformed by the piezo actuators, the hinge flexure moves the motion stage while serving to limit motion directions of the motion stage or guide the motion stage in specific directions. If values of stiffness of the hinges are known, it is possible to find out a feed of the motion stage when forces are applied to the hinges by the piezo actuators. Assuming that an axial direction of the hinge is an x-axis, relationship equations between the force and the displacement can be simplified like formulas (1), (2) and (3) with respect to the x-axis and y- and z-axes that are shear directions of the x-axis. These are well-known equations obtained by Paros-Weisbord, which have been verified through many experiments.

$$\frac{\Delta x}{F_x} \approx \frac{2R^{1/2}}{Et^{3/2}} \quad (1)$$

$$\frac{\Delta y}{F_y} = \frac{\Delta z}{F_z} \approx \frac{2R^{1/2}}{Gt^{3/2}} \quad (2)$$

$$\frac{\alpha_y}{M_y} = \frac{\alpha_z}{M_z} \approx \frac{20R^{1/2}}{Et^{7/2}} \quad (3)$$

where R and t are a radius and a thickness of the circular hinge as shown in FIG. 8, respectively, E is Young's modulus, G is a shear modulus, M is a torsional moment, and a is a rotational angle.

Since formulas (1), (2) and (3) have values within an error range of 10% as compared with results of a finite element method, they can be sufficiently accepted even through a machining tolerance of the circular hinge and hysteresis of the elastic material thereof are taken into consideration.

In the meantime, stress and strain to be generated in the hinge should be essentially taken into consideration upon design of the hinge flexure of the present invention. In the case of design of the hinge, a relationship between angular displacement and maximum stress $\sigma_{max}$ of the hinge is expressed as the following formula:

$$\theta = \frac{4K}{K_t} \frac{R}{Et} \sigma_{max} \quad (4)$$

Linear displacement can be obtained from the following formula:

$$K_t = \frac{2.7t + 5.4R}{8R + t} + 0.325 \quad (5)$$

-continued $$\delta = L \cdot \theta$$

where $\theta$ is the angular displacement, K is a proportional constant, $K_t$ is a constant defined by formula (5), $\delta$ is feeding displacement, and L is an effective length of the hinge. Therefore, the maximum stress $\sigma_{max}$ and the Young's modulus E can be known by selecting material suitable for obtainment of desired displacement, and the radius R and thickness t of the hinge can be appropriately determined through repetitive calculations of formulas (4) and (5). The radius R and thickness t determined in such a way are substituted into formulas (1), (2) and (3) to determine the stiffness of the hinge.

In the ultra-precision positioning system according to the present invention, the aforementioned lever members 68, 78 and 88 are utilized in connection with the vertical direction in order to reduce the entire height of the system while enhancing the stiffness of the motion stage itself. If the vertical motion direction of the motion stage 20 is defined as the z-axis, the driving system of the ultra-precision positioning system should have a structure of which height is low in the z-axis direction in order to minimize the height of the entire configuration thereof and simultaneously maximize the stiffness of the system. Generally, since maximum expansions of the piezo actuators 61, 71 and 81 are merely about 0.1% of the lengths thereof, the piezo actuators should be long to obtain a desired feeding range. For example, in order to obtain a feed equal to or larger than 125 µm, piezo actuators having a length of 200 mm are required. Thus, according to the present invention, the piezo actuators 61, 71 and 81 are horizontally positioned in consideration of the lengths thereof, and horizontal motions of the piezo actuators are converted into vertical motions by the lever members 68, 78 and 88, thereby reducing the height of the ultra-precision positioning system according to the present invention.

Figure 10A:
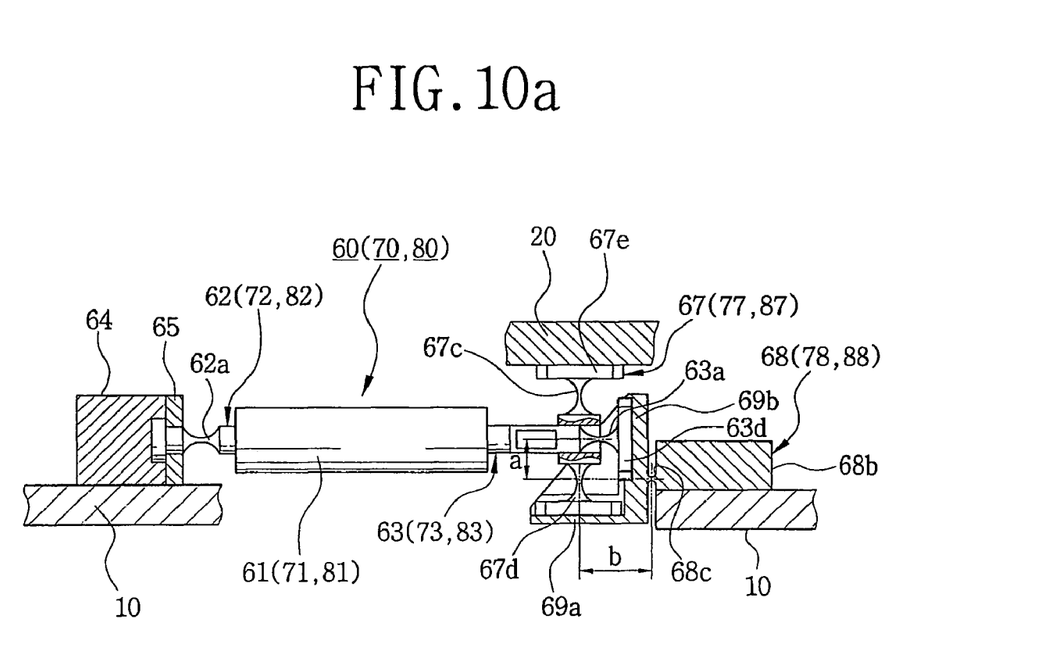
FIGS. 10a and 10b are sectional views showing an operation of the fourth feeding mechanism according to the present invention.

The first lever member 68 will be explained by way of an example. The lever member 68 is designed such that actual vertical displacement of the motion stage 20 is made to be twice as large as the horizontal displacement of the piezo actuator 61 by adjusting a position of the hinge 68*c* which is an application point of the force transferred by the piezo actuator 61. That is, as shown in FIG. 10*a*, assuming that a vertical distance between an extension line of the center of the hinge 63*a* of the second hinge member 63 in the x-axis direction and the center of the hinge 68*c* of the lever member 68 is a, and a horizontal distance between an extension line of the centers of the first and second hinges 67*c*, 67*d* of the third hinge member 67 in the y-axis direction and the center of the hinge 68*c* of the lever member 68 is b, since a central rotational angle of the hinge 68*c* of the lever member 68 with respect to fine displacement of the hinge 63*a* of the second hinge member 63 which is produced by the fourth piezo actuator 61 is constant, the following formula is established:

$$\Delta y [=b\theta]=2\Delta x [=2a\theta]$$

$$b=2a \quad (6)$$

where $\theta$ is the rotational angle about the center of the hinge 68*c* of the lever member 68, $\Delta y$ is the vertical displacement, and $\Delta x$ is the horizontal displacement. When the horizontal displacement is produced at the joint plate 63*d* of the second hinge member 63 by the fourth piezo actuator 61, the displacement is amplified at the center of the hinge 68*c* of the lever member 68 according to formula (6). The amplified displacement is converted into the vertical displacement by the first lever 68*a* of the lever member 68 and the second joint plate 67*f* of the third hinge member 67.

Axial stiffness $K_a$ of the stage driving parts constructed by the piezo actuators and the hinge elements and members of the present invention can be obtained from the following formula (7), and radial stiffness $K_r$ thereof can be obtained from the following formula (8):

$$\frac{1}{K_a} = 2\frac{2R^{1/2}}{Et^{7/2}} + \frac{1}{K_{pzt}} \quad (7)$$

$$\frac{1}{K_r} = \frac{L^2}{2}\frac{20R^{1/2}}{Et^{7/2}} + \frac{2R^{1/2}}{Gt^{5/2}} \quad (8)$$

where $K_{pzt}$ is stiffness of the piezo actutator, and L is a distance between the centers of the hinges of the first and second hinge elements, including the piezo actuator. The stiffness of the entire stage driving parts can be known by substituting the radius R and the thickness t into formulas (7) and (8).

Next, an operation of the ultra-precision positioning system according to the present invention will be described. In the following formulas, the x-axis translational motion is expressed as X, the y-axis translation motion is expressed as Y, the z-axis translational motion is expressed as Z, the x-axis rotational motion is expressed as $\Theta x$, the y-axis rotational motion is expressed as $\Theta y$, and the z-axis rotational motion is expressed as $\Theta z$. Further, the driving signal for the first piezo actuator is expressed as X1, the driving signals for the second and third piezo actuators are expressed as Y1 and Y2, respectively, and the driving signals for the fourth to sixth piezo actuators are expressed as Z1, Z2 and Z3.

First, the operation of the first feeding mechanism 30 will be described with reference to FIGS. 3 and 5. If the driving signal (X1) is inputted into the first piezo actuator 31 of the first feeding mechanism 30 under the control of the controller 90, the x-axis translational motion of the motion stage 20 is produced as can be seen from the following formula (9):

$$\therefore X=X1 \quad (9)$$

At this time, the stage driving portion of the first feeding mechanism 30 constructed by the first piezo actuator 31 and the first and second hinge elements 32, 33 has axial stiffness considerably larger than rotational stiffness thereof. Thus, the first feeding mechanism 30 can sufficiently perform alone the x-axis translational motion of the motion stage 20.

Next, the y-axis translational motion and the z-axis rotational motion of the motion stage 20 by the operations of the second and third feeding mechanisms 40, 50 will be described. If identical driving signals (Y1=Y2) are inputted into the second piezo actuator 41 of the second feeding mechanism 40 and the third piezo actuator 51 of the third feeding mechanism 50 under the control of the controller 90, the y-axis translational motion of the motion stage 20 is produced by the driving of the second and third piezo actuators 41, 51, as can be seen from the following formula (10):

$$Y1=Y2 \therefore Y=Y1(=Y2) \quad (10)$$

The z-axis rotational motion $\Theta z$ of the motion stage 20 is produced when driving signals different from each other are inputted into the second piezo actuator 41 of the second feeding mechanism 40 and the third piezo actuator 51 of the third feeding mechanism 50 under the control of the controller 90. If the distance between the second and third feeding mechanisms 40, 50 is defined as L (see FIG. 1), the value of the z-axis rotational motion $\Theta z$ can be obtained from the following formula (11):

$$\Theta z = (Y2 - Y1)/L \tag{11}$$

In the ultra-precision positioning system according to the present invention, the distance L between the second and third feeding mechanisms 40, 50 should be arranged so as not to produce any interference between the y-axis translational motion and the z-axis rotational motion $\Theta z$. The distance L between the second and third feeding mechanisms 40, 50 is determined by applying Lagrangian method or Newton's equation of motion to two variables for two directional motions.

If T is kinetic energy, V is potential energy, Q is an external force, and Lagrangian L=T−V, the following formula is established:

$$\frac{\alpha_y}{M_y} = \frac{\alpha_z}{M_z} \approx \frac{20 R^{1/2}}{E t^{7/2}} \tag{12}$$

Alternatively, if the Newton's equation of motion is applied, the following formula is established:

$$m\ddot{x} = \sum_i F_i \tag{13}$$

A two-degree-of-freedom equation of motion is determined in the form of a matrix according to these formulas (12) and (13). In order to maximally reduce interference between the two degrees of freedom, all remainder components except for diagonal components in the matrix of the equation of motion are caused to be set to 0. Accordingly, it is possible to determine the distance L between the second and third feeding mechanisms 40, 50.

Figure 9:
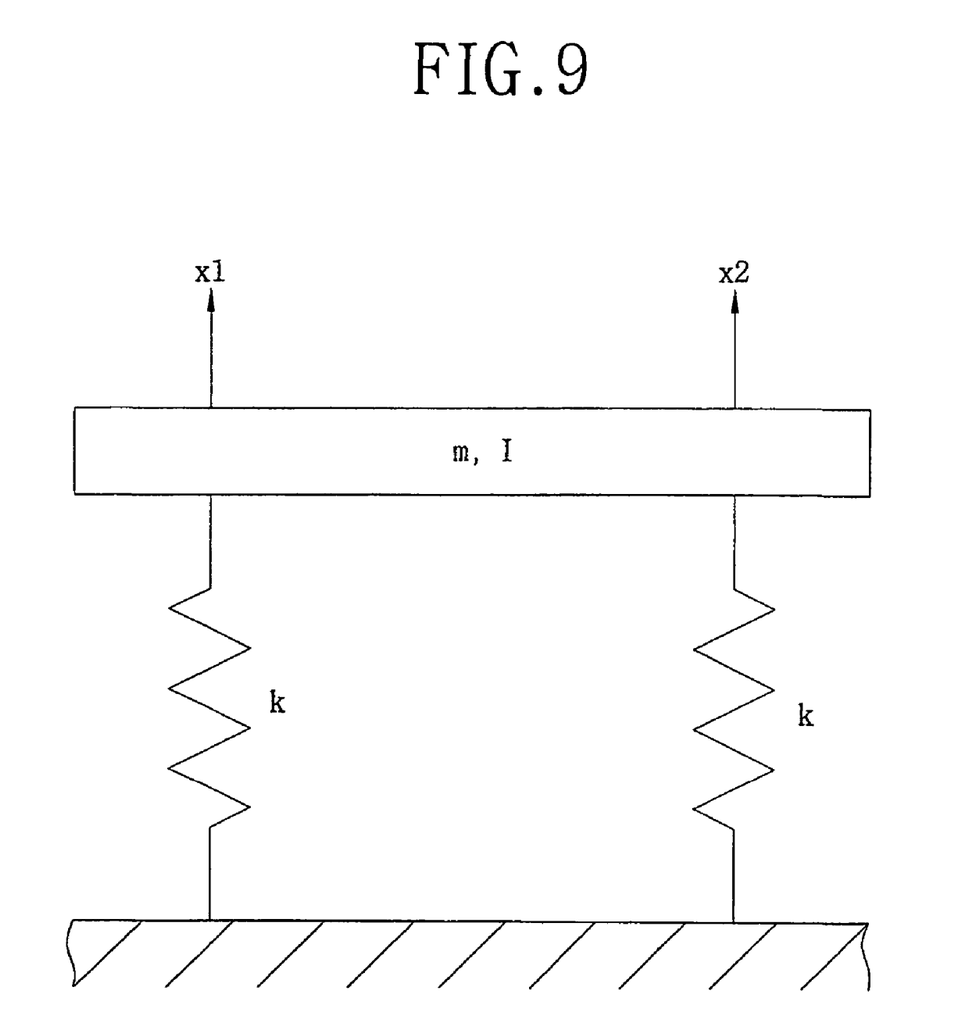
FIG. 9 is a view illustrating a model for obtaining a distance between the second and third feeding mechanisms according to the present invention.

Formulas (14a) to (14h) show a process of obtaining the distance M between the second and third feeding mechanisms 40, 50. Referring to FIG. 9, k is a value of the stiffness obtained from formula (7), mass m and mass moment of inertia I are property values of the motion stage 20.

The equation of motion according to formula (12) or (13) can be expressed as the following formulas:

$$m\left(\frac{\ddot{x}1 + \ddot{x}2}{2}\right) = -kx1 - kx2 \tag{14a}$$

$$I\ddot{\theta} = -L^2 k\theta \tag{14b}$$

$$\theta = \frac{x2 - x1}{L} \tag{14c}$$

If formulas (14a), (14b) and (14c) are combined and arranged, the following formulas are established:

$$\frac{m}{2}\ddot{x}1 + \frac{m}{2}\ddot{x}2 + kx1 + kx2 = 0 \tag{14d}$$

-continued $$-\frac{I}{L}\ddot{x}1 + \frac{I}{L}\ddot{x}2 - Lkx1 + Lkx2 = 0 \tag{14e}$$

At this time, formulas (14d) and (14e) can be arranged into a matrix form of the following formula (14f):

$$\begin{bmatrix} \frac{Im}{L} & 0 \\ 0 & \frac{Im}{L} \end{bmatrix} \begin{bmatrix} \ddot{x}1 \\ \ddot{x}2 \end{bmatrix} + \begin{bmatrix} \frac{Ik}{L} + \frac{Lmk}{2} & \frac{Ik}{L} - \frac{Lmk}{2} \\ \frac{Ik}{L} - \frac{Lmk}{2} & \frac{Ik}{L} + \frac{Lmk}{2} \end{bmatrix} \begin{bmatrix} x1 \\ x2 \end{bmatrix} = \begin{pmatrix} 0 \\ 0 \end{pmatrix} \tag{14f}$$

In order to minimize interference between the second and third feeding mechanisms 40, 50, all remainder components except for diagonal components in the matrix are caused to be set to 0. That is, if the components in the $1^{st}$ row and $2^{nd}$ column and the $2^{nd}$ row and $1^{st}$ column in formula (14f) satisfy the following formula (14g), the distance L between the second and third feeding mechanisms 40, 50 is expressed as the following formula (14h).

$$\frac{Ik}{L} - \frac{Lmk}{2} = 0, \tag{14g}$$

$$L = \sqrt{\frac{2I}{m}} \tag{14h}$$

Finally, the operations of the fourth to sixth feeding mechanisms 60, 70 and 80 will be described with reference to FIGS. 3, 4, 10a and 10b. The fourth to sixth feeding mechanisms 60, 70 and 80 of the present invention implement three degrees of freedom, i.e. the z-axis translational motion, the x-axis rotational motion $\Theta x$ and the y-axis rotational motion $\Theta y$. Therefore, the fourth to sixth feeding mechanisms 60, 70 and 80 should be arranged such that any interference is not produced among the respective motions in the same manner as the second and third feeding mechanisms 40, 50.

Figure 10B:
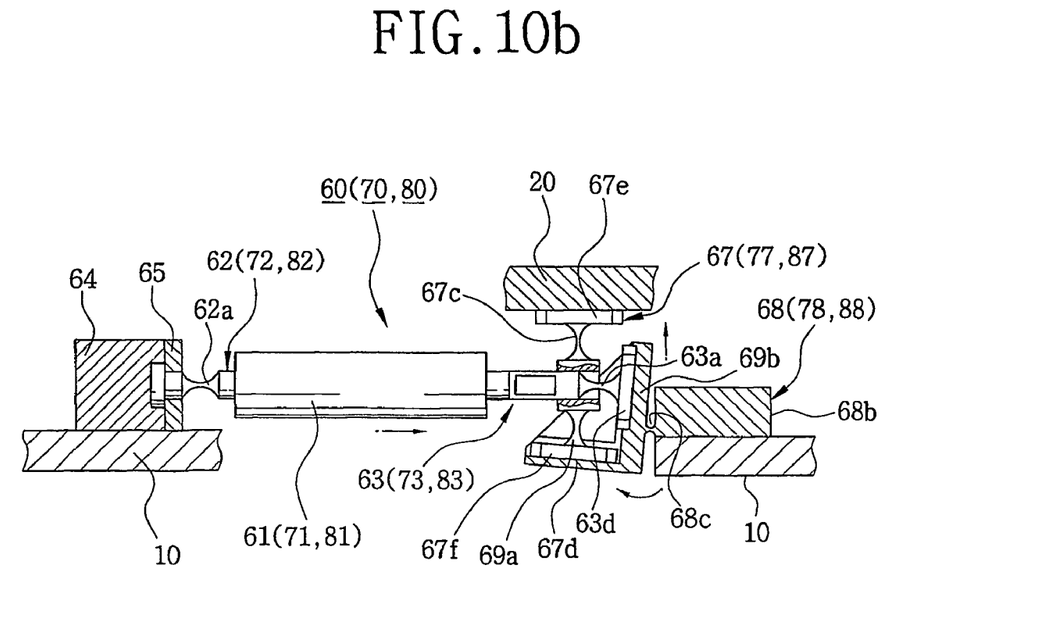

Meanwhile, if identical driving signals (Z1=Z2=Z3) are inputted into the fourth to sixth piezo actuators 61, 71 and 81 of the fourth to sixth feeding mechanisms 60, 70 and 80 under the control of the controller 90, the z-axis translational motion of the motion stage 20 is performed as can be seen from the following formula (15):

$$Z1 = Z2 = Z3 \therefore Z = Z1(=Z2 = Z3) \tag{15}$$

The y-axis rotational motion $\Theta y$ of the motion stage 20 is produced when a driving signal is not inputted into the fourth piezo actuator 61 of the fourth feeding mechanism 60 and driving signals different from each other are inputted into the fifth piezo actuator 71 of the fifth feeding mechanism 70 and the sixth piezo actuator 81 of the sixth feeding mechanism 80 under the control of the controller 90. That is, if the distance between the fifth and sixth feeding mechanisms 70, 80 is defined as d (see FIG. 1), the value of the y-axis rotational motion $\Theta y$ can be obtained from the following formula (16):

$$\Theta y = (Z2 - Z3)/d \tag{16}$$

The x-axis rotational motion $\Theta x$ of the motion stage 20 is produced when identical driving signals (Z2=Z3) are inputted into the fifth piezo actuator 71 of the fifth feeding mechanism 70 and the sixth piezo actuator 81 of the sixth feeding mechanism 80 and a different driving signal (Z1) is inputted into the fourth piezo actuator 61 of the fourth feeding mechanism 60 under the control of the controller 90. That is, if the distance between the fourth feeding mechanism 60 and the fifth or sixth feeding mechanism 70 or 80 is defined as D, the value of the x-axis rotational motion Θx can be obtained from the following formula (17):

$$\Theta x = (Z1 - Z2)/D \tag{17}$$

Therefore, upon determination of the respective positions of the fourth to sixth feeding mechanisms 60, 70 and 80, after displacement variables corresponding to the respective fourth to sixth feeding mechanisms 60, 70 and 80 are first defined, they are determined in the form of a matrix of the equation of motion by the Lagrangian method of formula (12) or the Newton method of formula (13) based on the kinetic and potential energy. In order to minimize interference among the respective degrees of freedom of the fourth to sixth feeding mechanisms 60, 70 and 80, all remainder components except for diagonal components in the matrix of the equation of motion are caused to be set to 0 in the same manner as formulas (14a) to (14h). Accordingly, it is possible to determine the distance D between the fourth feeding mechanism 60 and the fifth or sixth feeding mechanism 70 or 80 as well as the distance d between the fifth and sixth feeding mechanisms 70, 80.

The above description is merely the description of a preferred embodiment of the present invention and the scope of the present invention is not limited to the described and illustrated embodiment. Those skilled in the art can make various changes, modifications and substitutions thereto within the technical spirit and the scope of the present invention defined by the appended claims. It should be understood that such embodiments fall within the scope of the present invention.

INDUSTRIAL APPLICABILITY

According to the ultra-precision positioning system of the present invention mentioned above, the multi-degree-of-freedom fine motion of the submicron order can be precisely performed by means of the piezo actuators, the hinge elements with the circular hinges and the lever members with the notch hinges. Furthermore, thanks to the hinge structure having elasticity, there is no interference wear and it is possible to maintain the very high repeatability and simultaneously perform a continuous and smooth fine motion. Moreover, the entire height thereof is low, the stiffness of the motion stage itself is high, and the system is little influenced by a change or gradient of temperature.

The invention claimed is:

1. An ultra-precision positioning system, comprising:
   a base;
   a motion stage movably provided above a top of the base;
   a first feeding means including a first actuator and first and second hinge elements with a circular hinge, the first feeding means performing an x-axis translational motion of the motion stage with respect to the base;
   a second feeding means including a second actuator and first and second hinge elements with a circular hinge, the second feeding means performing a y-axis translational motion and a z-axis rotational motion of the motion stage with respect to the base;
   a third feeding means including a third actuator and first and second hinge elements with a circular hinge, the third feeding means performing the y-axis translational motion and the z-axis rotational motion of the motion stage with respect to the base in cooperation with the second feeding means;
   a fourth feeding means including a fourth actuator, first and second hinge members with a circular hinge, a first lever member cooperating with the second hinge member, and a third hinge member cooperating with the first hinge member, the fourth feeding means performing an x-axis rotational motion of the motion stage with respect to the base; and
   a control means for controlling the first to fourth actuators of the first to fourth feeding means.

2. The system as claimed in claim 1, further comprising a fifth feeding means including a fifth actuator controlled by the control means, fourth and fifth hinge members with a circular hinge, a second lever member cooperating with the fifth hinge member, and a sixth hinge member cooperating with the second lever member, the fifth feeding means performing the x-axis rotational motion and a y-axis rotational motion of the motion stage with respect to the base in cooperation with the fourth feeding means.

3. The system as claimed in claim 2, further comprising a sixth feeding means including a sixth actuator controlled by the control means, seventh and eighth hinge members with a circular hinge, a third lever member cooperating with the eighth hinge member, and a ninth hinge member cooperating with the third lever member, the sixth feeding means performing a z-axis translational motion, the x-axis rotational motion and the y-axis rotational motion of the motion stage with respect to the base in cooperation with the fourth and fifth feeding means.

4. The system as claimed in claim 3, wherein the second hinge member of the fourth feeding means, the fifth hinge member of the fifth feeding means and the eighth hinge member of the sixth feeding means penetrate through and are fitted into the third hinge member, the sixth hinge member and the ninth hinge member, respectively; and the first, second and third lever members are formed with notch hinges and fixedly mounted with the second and third hinge members, the fifth and sixth hinge members, and the eighth and ninth hinge members, respectively.

5. The system as claimed in claim 3, wherein the first, fourth and seventh hinge members of the fourth to sixth feeding means are fixed to the base, respectively; the fourth feeding means is arranged above and parallel to an x-axis centerline of the base; a center of the hinge of the second hinge member of the fourth feeding means lies on a y-axis centerline of the base; and the fifth and sixth feeding means are arranged below and parallel to the x-axis centerline of the base and to be symmetric with each other with respect to the y-axis centerline.

6. The system as claimed in claim 3, wherein the fourth to sixth feeding means are constructed to satisfy a following relationship equation:

$$b = 2a$$

where a is a vertical distance between extensions of centers of hinges of the second, fifth and eighth hinge members in an x-axis direction and centers of the hinges of the first to third lever members, and b is a horizontal distance between extensions of centers of the hinges of the third, sixth and ninth hinge members in a y-axis direction and the centers of the hinges of the first to third lever members.

7. The system as claimed in claim 1, wherein the first and second hinge elements of the first feeding means are aligned with an x-axis centerline of the base and fixed to the base and the motion stage, respectively; and a center of the hinge of the second hinge element of the first feeding means which is positioned on a side to be fixed to the motion stage is coincident with a center of the motion stage.

8. The system as claimed in claim 1, wherein the first and second hinge elements of the second and third feeding means are arranged parallel to a y-axis centerline of the base and fixed to the base and the motion stage, respectively; and centers of the hinges of the second hinge elements of the second and third feeding means which are positioned on a side to be fixed to the motion stage lie on an x-axis centerline of the base.

9. The system as claimed in claim 1, wherein a distance L between the second and third feeding means satisfies a following relationship equation:

$$L = \sqrt{\frac{2I}{m}}$$

where m is mass of the motion stage, and I is mass moment of inertia of the motion stage.

* * * * *